(12) United States Patent
Pertchik

(10) Patent No.: US 6,566,593 B2
(45) Date of Patent: May 20, 2003

(54) MUSICAL KEYBOARD WITH A SEQUENCED MARKINGS

(76) Inventor: S. Roy Pertchik, 89 Bleecker St., 1C, New York, NY (US) 10012

(*) Notice: Subject to any disclaimer, the term of this patent is extended or adjusted under 35 U.S.C. 154(b) by 0 days.

(21) Appl. No.: 09/992,762

(22) Filed: Nov. 6, 2001

(65) Prior Publication Data

US 2002/0029682 A1 Mar. 14, 2002

Related U.S. Application Data

(60) Provisional application No. 60/111,326, filed on Nov. 6, 2001.

(51) Int. Cl.[7] .............................................. G01C 3/12
(52) U.S. Cl. ...................... 84/423 R; 84/477 R; 84/478; 84/479 A; 84/427; 84/428
(58) Field of Search .......................... 84/423 R, 477 R, 84/478, 479 A, 427, 428

(56) References Cited

U.S. PATENT DOCUMENTS

| | | | | |
|---|---|---|---|---|
| 360,255 A | * | 3/1887 | Janko | 84/428 |
| 572,550 A | * | 12/1896 | Clements-Kropp | 84/423 R |
| 1,958,227 A | * | 5/1934 | Barnett | 84/423 R |
| 4,926,734 A | * | 5/1990 | Rickey | 84/423 R |
| 5,323,679 A | * | 6/1994 | Riday | 84/423 R |
| 5,404,788 A | * | 4/1995 | Frix | 84/423 R |

FOREIGN PATENT DOCUMENTS

| | | | |
|---|---|---|---|
| DE | 3510986 | * | 4/1986 |
| DE | 3729182 | * | 3/1989 |

* cited by examiner

*Primary Examiner*—Shih-Yung Hsieh

(57) ABSTRACT

A musical keyboard has keys arranged and marked for generating tones of a twelve-tone scale. A first register of keys generates first sets of six tones being whole tones apart in the twelve-tone scale. A second register of keys generates second sets of six tones being whole tones apart in the twelve-tone scale. The tones of each first set are disjoint and half-tones apart from the tones of each second set, and the tones of the first and second set correspond alternately to the twelve-tone scale. The keys on the first register are linearly arranged between the keys on the second register, and the keys on the second register are linearly arranged between the keys on the first register. The keys have markings arranged in units of three unique markings, and the units of three unique markings repeat identically and sequentially on the keys of the first and second registers. Any key with a particular unique marking on one register is linearly disposed approximately halfway between two corresponding keys having the identical particular unique marking on the other register to enable uniform fingering for all transpositions of the twelve-tone scale.

20 Claims, 2 Drawing Sheets

MUSICAL KEYBOARD WITH A SEQUENCED MARKINGS

This Application claim the benefit of provisional App No. 60/111,326 Filed Nov. 6, 2001.

FIELD OF THE INVENTION

This invention relates generally to musical keyboards, and more particularly to musical keyboards with spatial, graphic, and tactile sequenced markings.

BACKGROUND OF THE INVENTION

Musical Tuning Systems

In the nearly universally adopted standard tuning system, also called tempered tuning, musical tones are defined by a logarithmic progression of frequencies such that one tone has a base frequency, (e.g., 440 Hz or 442 Hz), and the frequencies of all of the tones doubles every twelfth tone going up the scale, and halves going down the scale. The result is a twelve-tone scale. It is a property of the twelve-tone scale that it is perceived as a linear sequence of musical tones.

In musical compositions, various tones are selected from the twelve-tone scale to create musical structures. Owning to the constancy of the perceived intervals in the logarithmic progression, it is possible to transpose these musical structures up and down the twelve-tone scale, at will, without altering the perceived relationships between the tones.

There are a number of common variant tuning systems for the twelve tones in an octave. In these variants, the frequencies used for the progression of tones differ from an exact logarithmic progression by a small amount. These variations, including for example "just intonation" and "stretch tuning," are in accord with certain harmonic and psychoacoustic properties of scales produced by natural phenomena, including the vibrations of stringed instruments, or the pitches produced by valved horns. It should be understood that the scope of the present invention described below is intended to include all such variants of the twelve tone scale.

To facilitate the composition of traditional western music, it is common to define a major scale as a subset of the twelve-tone scale in which certain tones are emphasized and identified as diatonic, or "in the major scale," and the remaining tones are de-emphasized and identified as accidentals, or "not in the major scale." The major scale, like any other musical structure, can be transposed at will.

Tone Naming Systems

It is customary to name the tones in the twelve-tone scale in the following chromatic sequence repeatedly:

. . . C, $C^{\#}$ or $D_b$, D, $D^{\#}$ or $E_b$, E, F, $F^{\#}$ or $G_b$, G, $G^{\#}$ or $A_b$, A, $A^{\#}$ or $B_b$, B, C, . . .

The names in this sequence are assigned to the twelve-tone scale so that the tone A corresponds to the base frequency. It is a property of this sequence that unique letter names, i.e., A through G, are assigned to the diatonic tones in a particular major scale transposition, specifically, the major scale starting with the tone C. It is another property of this sequence that the accidental tones are named according to their adjacency to the diatonic tones.

The relationship of an accidental tone to a diatonic tone is shown by the use of a "$_b$" or "flat," meaning directly below the diatonic tone, and a "$^{\#}$" or "sharp," meaning directly above the diatonic tone. Therefore, accidental tones have two possible names, one being the flat of the diatonic tone above, and the other being the sharp of the diatonic tone below.

It is possible to list the C major scale diatonic tones in what is called the root position, starting with the tone C, thus:

. . . C, D, E, F, G, A, B, . . .

Scale Transpositions

With the above musical naming system, it is possible to transpose the major scale structure while maintaining all of the internal interval relationships, and to obtain names for the new set of diatonic tones without repeating any letters. Thus, a transposition from the scale beginning with the tone C to the scale beginning with the tone F results in the following sequence of letter names for the diatonic tones: F, G, A, $B_b$, C, D, E; a transposition to the scale beginning with the tone $A_b$ results in the following sequence of names: $A_b$, $B_b$, C, $D_b$, $E_b$, F, G, $A_b$, and a transposition to the scale begging with the tone B results in the following sequence of names: B, $C^{\#}$, $D^{\#}$, E, $F^{\#}$, $W^{\#}$, $A^{\#}$, B.

It can be demonstrated that the sequence of letters A through G can be modified by the addition of appropriate sharps and flats to represent the diatonic tones of any major scale transposition. The simplicity of such representation is a property of, and the principle benefit of this naming system.

Conventional Musical Keyboard

FIG. 1 shows a conventional keyboard 100 where tones and keys are arranged in a pattern that corresponds to the naming system described above. Therefore, the twelve-tone scale is arranged so that the keys corresponding to diatonic tones in the key of C are on white keys of a lower register 101, closer to a musician, and the black keys corresponding to the accidental tones are arranged on an upper register 102, further from the musician. This arrangement facilitates at least two things. First, there is a visible relationship between the physical layout of the tones and the naming system, and second, music written in the scale of C is easy to play.

However, the arrangement of the keyboard 100 hinders the musician playing compositions transposed to other scales. It is well known that the transposition of given musical structures on the conventional keyboard results in the necessity for the musician to learn completely different and complex fingering patterns.

For example, the first three tones in the major scale of C are C, D, E. The corresponding keys lay next to each other on the lower register 101. The same structure in the scale of D is D, E, $F^{\#}$. The first two of these tones are on keys of the lower register 101 and the third tone is on a key of the upper register 102. As a consequence of this property of the conventional keyboard, musicians must spend years learning thousands of musical structures each requiring unique fingerings in all of the possible scale transpositions.

Alternative Musical Keyboards

For the purpose of ensuring consistency of fingering patterns for similar structures, regardless of scale transpositions, alternative keyboards have been designed where the tones of the twelve-tone scale are laid out so that successive tones alternate between a lower and an upper register throughout the keyboard, see for example, U.S. Pat. No. 360,255 issued to Von Jankó on Mar. 29, 1887. The Von Jankó keyboard has several keys attached to a single register.

In that arrangement, the first three tones of a major scale are on keys of one register and the following four tones on keys of the other register. This is true regardless of scale transpositions. Thus, all twelve-scale transpositions fall into one of two types, six that start on the lower register and six that start on the upper register. The six scale transpositions that start on the lower register have identical fingerings for all structures. The six scale transpositions that start on the upper register also have identical fingerings for all structures. Finally, the fingerings for the two types are merely mirror images of each other with regards to the keys of the upper and lower registers, and so they are quite closely related. Thus the total number of fingering patterns to be learned is drastically reduced.

A number of other keyboard arrangements and coloring schema have followed the Von Jankó style.

U.S. Pat. No. 4,926,734 issued to Rickey on May. 22, 1990 describes a three-register equal temperament whole tone graphic and tactile keyboard. An upper register of keys has the sharp keys (#) extended forward. The upper register keys are narrower than any of the other keys and uses a "four white—two black" pattern like Von Jankó, with the black keys extended forward. The middle register uses a "five white-one black" pattern, and the black keys for the tone C being larger than the other keys and also extended forward. The lower register keys are approximately aligned with and play the same tones as the upper register keys; although these keys are considerable larger than the keys of the top register, again using the "four white-two black" pattern.

U.S. Pat. No. 5,323,679 issued to Riday on Jun. 28, 1994 describes an ergonomic keyboard system with a unified fingering system for both the right and the left hand. Three or more parallel horizontal one-octave rows of monolithic keys in half-tone increments are offset from each other in a uniform parallelogram-shaped tiered array with a tone duplication offset which facilitates an octave span. All keys have a uniform shape. Tone and key association is visually indicated by white, black and optionally gray, or other colors. The key shape is tapered to a narrowed end width to allow tolerance for a finger or thumb to extend past key edges without interfering with the next adjacent key.

U.S. Pat. No. 5,404,788 issued to Frix on Apr. 11, 1995 describes a keyboard based on the twelve-tone scale that has keys on at least two playing registers. The keys F, G, A, B, C, D, and E are formed from a white smooth material, and the flat ($_b$) keys are formed from a black rough material which is distinguished both tactually and visually from the white smooth material. The color pattern on the front register alternates four white keys with two black keys, and the color pattern on the rear register alternates three white and three block keys.

However, all of these keyboards present a new problem. That problem is the difficulty in identifying the keys. Most of these keyboards use patterns of two colors repeating on the two registers. For example, four white keys alternating with two black keys are used on one register, and three white keys alternating with three black keys are used on the other register.

Most notably, those color identifications result in visual patterns which appear different with respect to different scale transpositions for the various musical structures. The prior art Von Jankó-like identifications fail to assist in the identification of musically useful intervals. As stated above, it is common and desirable to move or transpose the musical structures up and down the twelve-tone scale, at will, without altering the perceived relationships between the tones.

Therefore, there is a need for a keyboard arrangement that is easy to learn and easy to use, and furthermore, the arrangement and markings of the keys should be consistent for all of the transpositions that are possible for musical structures.

SUMMARY OF THE INVENTION

The invention provides a musical keyboard with keys that are arranged and marked for generating tones of a twelve-tone scale. A first register of keys generates first sets of six tones being whole tones apart in the twelve-tone scale. A second register of keys generates second sets of six tones being whole tones apart in the twelve-tone scale.

The tones of the first and second set are disjoint and half-tones apart from each other, and the tones in the first and second set correspond alternately to the twelve-tone scale. The keys of the first register are approximately linearly arranged between the keys of the second register, and the keys of the second register are approximately linearly arranged between the keys of the first register.

The keys of the registers have markings. The markings are arranged in units of three unique markings, such that the units of three unique markings repeat identically and sequentially on the first and second registers, such that any key with a particular unique marking of one register is linearly disposed halfway between two corresponding keys having the identical unique marking on the other register to enable uniform fingering for all transpositions of the twelve-tone scale. In one aspect of the invention, the markings can be visual, tactile, or both.

DETAILED DESCRIPTION OF THE PREFERRED EMBODIMENT

Figure 1:
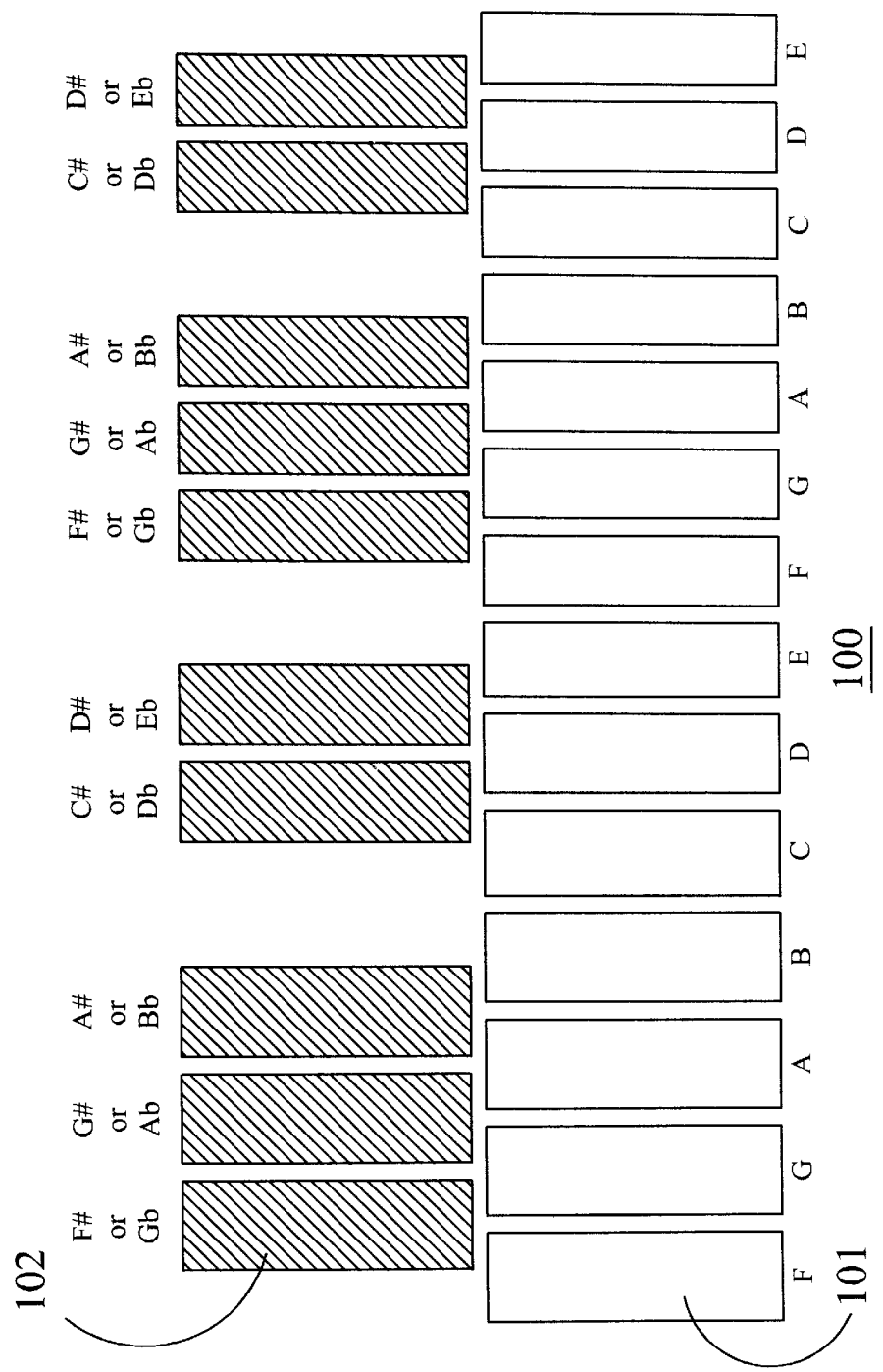
FIG. 1 is a plan view of a musical keyboard according to the prior art.
Figure 2:
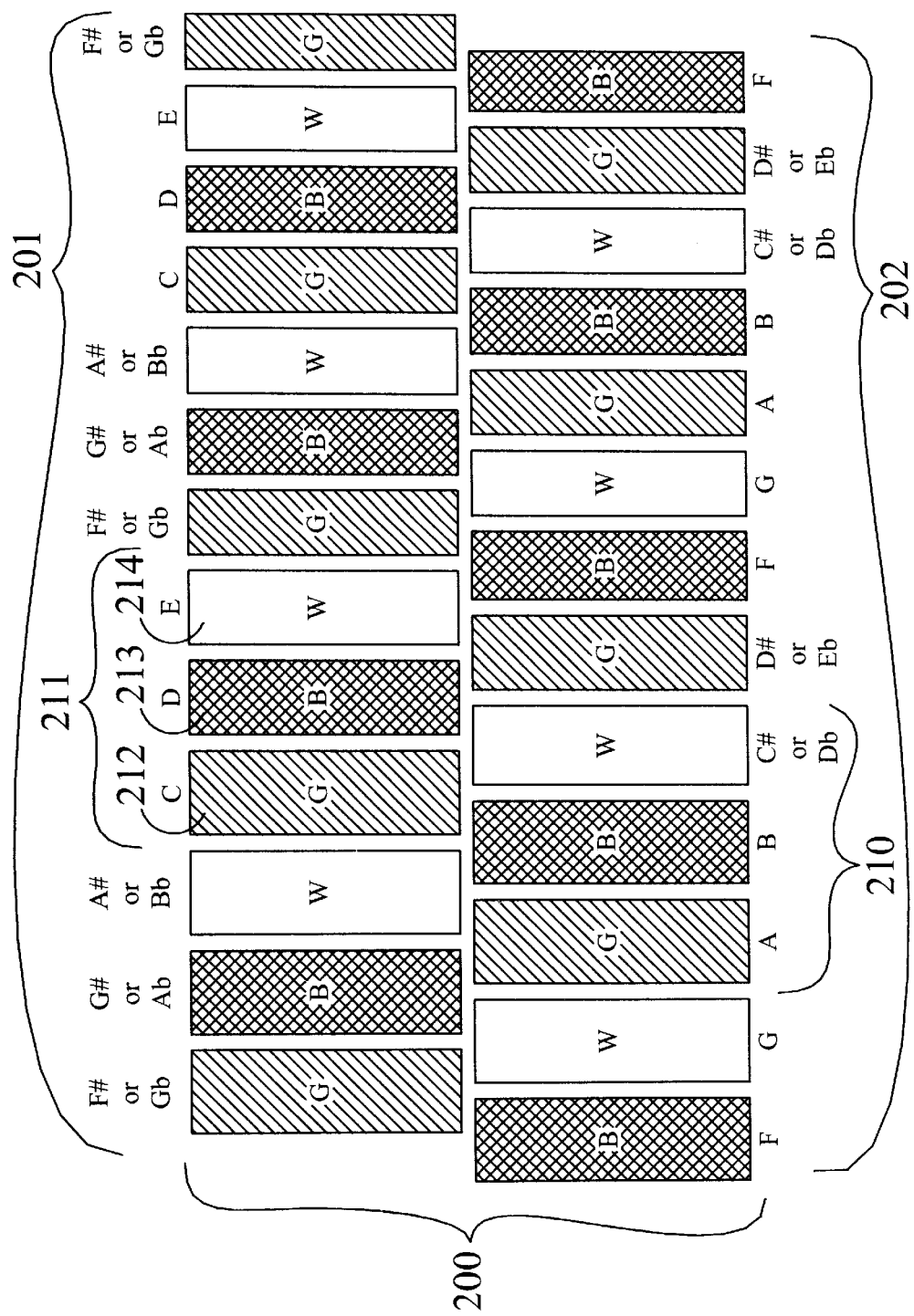
FIG. 2 is a plan view of a musical keyboard according to the invention.

FIG. 2 shows a musical keyboard according to my invention. My musical keyboard includes one or more pairs 200 of registers 201–202. The keys can be uniform in size, place and alignment. The keys on the upper register 201, for a particular octave, for example, an octave beginning at the tone C, generate first sets of six tones C, D, E, F#, G# and A#, and the keys on the lower register 202, for the remainder of the octave, generate second sets of six tones C#, D#, F, G, A, B, or the reverse. Note, the tones in first sets are disjoint and half-tones apart from the tones in the second set, and the tones in the first set and the second set alternately correspond to the tones of the twelve-tone scale.

The keys on the upper register 201 are arranged so that their center lines align approximately between the keys on the lower register 202, and the center lines of the keys on the lower register align approximately between keys of the upper register so that progressing up the twelve-tone scale beginning at C, e.g., the tones are C, C#, D, D#, E, F, F#, G, G#, A, A#, and B, the corresponding keys alternate between the upper and lower registers 201–202. The keys on the first and second registers can partially overlap in the vertical direction.

The keys are marked with a pattern that includes units of three unique markings for the registers 210 and 220. These units of three unique markings are repeated on all registers. For example, in a visual pattern the markings can be three different colors (gray (G), black (B) and white (W), or icons such as numerals, geometric patterns (circle, triangle, and square), or the Roman numerals I, II, and III. In a tactile pattern, unique textures can be used on the keys, e.g., smooth, bumps, and grooves.

It should be understood that the first and second registers can be duplicated with the keys of the additional registers being aligned so that the center lines of duplicated keys are aligned with corresponding keys on the first and second registers. In the preferred embodiment, the playing surface of the keys is coplanar, and the keys are identically sized and shaped. However, the keys can also be square, hexagonal, or round to accommodate acoustic properties and ergonomic characteristics of different musical instruments.

In FIG. 2, the units are shown as blank 214, with slanted lines 212, and with cross-hatched lines 213. In addition, multiple visual and tactile units can be combined on individual keys so that the keys can be identified by sight and by touch.

In such an arrangement, each octave has four adjacent and identical marked units of three keys, two on one register, and two on the other register.

The three units in the pattern are assigned in rotation to successive keys going forward in the scale, hereafter called a "forward sequence." The backward order of assignment is also useful for identifying the keys, and is hereinafter called a "reverse sequence." For example, if the forward sequence includes the three color units gray (G) black (B), and white (W), then the reverse sequence are the colors white, black, and gray. In addition, the keys with identical markings are in the middle of each other with respect to the upper and lower registers. In FIG. 2, the first "B" key in the upper register 201 is in the middle of the first two "B" keys in the lower register 202, and so forth.

As an advantage of my the invention, my method for identifying keys provides visual and/or tactile patterns, in which identical musical structures look or feel similar in all twelve-scale transpositions, unlike the prior art where the transpositions are different. Furthermore, the keys identified in this manner, unlike the prior art, indicate useful musical intervals.

An example of the first benefit is the visual appearance of a major scale. In any key, the first three tones of a major scale are always a group of three adjacent keys on one register, (e.g., C, D, E), and these keys are always marked in the reverse sequence. These first three tones are then always followed by a group of four tones (e.g., F, G, A, B) on the keys of the other register, also marked in the reverse sequence.

The group of four tones is always bounded by keys (e.g., F-B) of the same markings (B-B), and this marking is always identical as the marking (B) of the middle key (e.g., D) in the first group of three keys on the other register. In addition, the markings (W-G) of the outer bounding keys of the group of three keys on one register are the same markings (W-G) as the middle keys of the group of four adjacent keys on the other register.

It is a property of this identification system that similarly consistent relationships are maintained for identical structures in all scale transpositions, regardless of a particular transposition, and six keys are the mirror image of the other six keys with regards to the upper and lower registers.

Examples of the second benefit are numerous. Taking all of the diatonic intervals for example, the musical interval known as a "second" is always on adjacent keys and in the reverse color sequence. A major "third" is always two keys away on the same register and in the forward color sequence. A perfect "fourth" is always the next color in reverse color sequence on the opposite register. A perfect "fifth" is always on the other register and is the second appearance of the next unit in the forward sequence. A major "sixth" is also always on the opposite register and is the second unit with the same marking. Finally, a major "seventh" is always on the other register and is the second appearance of the next unit in the reverse color sequence.

As an advantage, these marking sequences are immediately self-evident, by sight or touch, and are reinforced by identical fingerings in all scale transpositions.

In addition, within any given octave, all of the keys bearing a particular marking comprise a diminished chord of four tones. Three such diminished chords of four tones are interleaved to correspond to all of the tones in a twelve tone scale, and the tones in any one of the three diminished chords bear identical marking as the other tones in the same diminished chord, while the identical markings of the four tones of any given diminished scale are distinct from the markings of the eight tones of the excluded two diminished chords.

Another example of the second advantage is the fact that minor thirds are all in the same unit. The result is that the twelve-tone scale is divided into three groups of four tones, each comprising a diminished arpeggio or a "broken chord" when the tones of a chord are sounded in rapid succession instead of simultaneously.

In contemporary music using conventional tuning, it is well known that there is great significance to these families of tones. Specifically, any structure can be transposed within a composition by one or more minor thirds to enable a new harmony that remains consonant with the original scale transposition. This property is exploited extensively in jazz and other contemporary musical traditions. On the traditional keyboard, these relationships are obscured and are therefore extremely difficult to learn. On the keyboard according to my invention, these relationships are self-evident and have identical fingerings and colorings.

Applications

The invention provides a method for marking tones in the twelve-tone scale when the tones are arranged in a continuously alternating pattern on a keyboard. The keys are marked with a pattern applied in sequential rotation of three units. The marking can be used for musical keyboards including pianos, organs, synthesizers, accordions, and any other instruments in which the tones are made to sound by pressing actuators. The method can be equally well used for other instruments including ones played by striking, such as xylophones, marimbas, vibraphones, glockenspiels, harp, etc. The invention can also be used to represent musical information in display form, such as graphics representations used on computer displays, and the like. The invention can also be used as the basis of procedural manipulation of musical tones by computers or other apparatus.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A musical keyboard for generating tones of a twelve-tone scale, comprising:

a first register of keys for generating first sets of six tones being whole tones apart in the twelve-tone scale;

a second register of keys for generating second sets of six tones being whole tones apart in the twelve-tone scale, the tones in each first set being disjoint and half-tones apart from the tones in each second set and the tones in the first set and the second set alternately corresponding to the tones of the twelve-tone scale, the keys on the first register linearly disposed between the keys on the second register, and the keys on the second register linearly disposed between the keys on the first register; and units of three unique markings repeating identically and sequentially on the keys of first register and the keys on the second register such that any key with a particular unique marking on one register is linearly disposed approximately halfway between two corresponding keys having the identical particular unique marking on the other register to enable uniform fingering for all transpositions of the twelve-tone scale.

2. The musical keyboard of claim 1 wherein the markings are visual.

3. The musical keyboard of claim 1 wherein the markings are tactile.

4. The musical keyboard of claim 1 wherein the units of three unique markings are assigned in rotation to successive keys going forward in the twelve-tone scale to constitute a forward sequence.

5. The musical keyboard of claim 1 wherein the units of three unique markings are assigned in rotation to successive keys going backwards in the twelve-tone scale to constitute a reverse sequence.

6. The musical keyboard of claim 5 wherein the first three tones of a major scale are generated by a group of three adjacent keys on one register marked in the reverse sequence, and the first three tones are followed by a group of four tones generated by four adjacent keys on the other register marked in the reverse sequence.

7. The musical keyboard of claim 1 wherein each register of keys has an associated planar playing surface, and the playing surfaces are on different planes.

8. The musical keyboard of claim 1 wherein the units of three unique markings are assigned in rotation to successive keys going forward in the twelve-tone scale to constitute a forward sequence, and wherein the units of three unique markings are assigned in rotation to successive keys going backwards in the twelve-tone scale to constitute a reverse sequence, and wherein a second interval is always an adjacent key marked in the reverse color sequence, a major third interval is always two keys away on the same register and marked in the forward color sequence.

9. The musical keyboard of claim 1 wherein the keys of the first register and the second register overlap vertically.

10. The musical keyboard of claim 1 further comprising:
additional registers of keys duplicating the first and second registers of keys with the additional registers of keys being aligned so that center lines of keys of duplicated tones on the additional registers are aligned with the corresponding keys of the first and second registers.

11. The musical keyboard of claim 1 wherein a tuning of the twelve-tone scale is modified by just intonation.

12. The musical keyboard of claim 1 wherein a tuning of the twelve-tone scale is modified by stretch tuning.

13. The musical keyboard of claim 1 wherein each register of keys has an associated planar playing surface, and the playing surfaces are coplanar.

14. The musical keyboard of claim 1 wherein the keys are substantially identical in size and shape.

15. The musical keyboard of claim 1 wherein keys vary in size and shape according to acoustic properties and ergonomics of a particular musical instrument.

16. The musical keyboard of claim 1 wherein the keys are substantially rectangular.

17. The musical keyboard of claim 1 wherein the keys are substantially hexagonal.

18. The musical keyboard of claim 1 wherein the tones are sounded by pressing the keys.

19. The musical keyboard of claim 1 wherein the tones are sounded by striking the keys.

20. A method for arranging and marking keys of a musical keyboard for generating tones of a twelve-tone scale, comprising:

providing a first register of keys for generating first sets of six tones being whole tones apart in the twelve-tone scale;

providing a second register of keys for generating second sets of six tones being whole tones apart in the twelve-tone scale, the tones of the first and second set being disjoint and half-tones apart from each other and the tones in the first set and the second set alternately corresponding to the twelve-tone scale, the keys on the first register linearly disposed between the keys on the second register, and the keys on the second register linearly disposed between the keys on the first register; and marking the keys on each register, the marking comprising units of three unique markings repeating identically and sequentially on the first and second registers such that any key with a particular unique marking on one register is linearly disposed halfway between two corresponding keys having the identical unique marking on the other register to enable uniform fingering for all transpositions of a twelve-tone scale.

* * * * *